United States Patent [19]

Lewis et al.

[11] Patent Number: 4,801,853
[45] Date of Patent: Jan. 31, 1989

[54] MOTION CONTROL SYSTEM FOR REEL TO REEL WEB TRANSPORT APPARATUS

[75] Inventors: Martyn Lewis, Pacific Palisades; Richard Anderson, Chatsworth, both of Calif.

[73] Assignee: Eastman Kodak Company, Rochester, N.Y.

[21] Appl. No.: 121,200

[22] Filed: Nov. 16, 1987

[51] Int. Cl.$^4$ ............................................. B65H 59/38
[52] U.S. Cl. .......................................... 318/7; 318/6; 242/75.51; 242/203; 242/204
[58] Field of Search ........................................ 318/3-7, 318/54-56, 59-60, 65, 87; 242/75, 75.2, 75.4, 75.43, 75.44, 75.5, 75.51, 75.47, 201-205

[56] References Cited

U.S. PATENT DOCUMENTS

| | | |
|---|---|---|
| 2,777,964 | 1/1957 | DiMino . |
| 3,235,197 | 2/1966 | Johnson et al. . |
| 3,348,107 | 10/1967 | Hamby . |
| 3,380,681 | 4/1968 | Baldwin, Jr. et al. . |
| 3,471,099 | 10/1969 | Albert . |
| 3,493,193 | 5/1968 | Crandall et al. . |
| 3,606,198 | 9/1971 | Gilbreath et al. . |
| 3,806,061 | 4/1974 | Kollar et al. ............... 242/186 |
| 3,809,336 | 5/1974 | Kollar et al. . |
| 3,904,142 | 9/1975 | Corse ............... 342/58.3 |
| 4,143,951 | 3/1979 | Suzaki et al. ............... 242/205 |
| 4,357,560 | 11/1982 | Woo et al. ............... 318/7 |
| 4,405,883 | 9/1983 | Ashida ............... 318/7 |
| 4,429,261 | 1/1984 | Ohno ............... 318/7 |
| 4,497,459 | 2/1985 | Yoshino et al. ............... 318/7 |
| 4,525,654 | 6/1985 | Tajima et al. ............... 318/7 |
| 4,573,645 | 3/1986 | Harris, Jr. ............... 318/7 |
| 4,620,241 | 10/1986 | Ono ............... 318/7 |
| 4,707,643 | 11/1987 | Rohr et al. ............... 318/7 |

OTHER PUBLICATIONS

Permanent Magnets and Their Application, Parker & Studders pp. 249–252; John Wiley & Sons, New York Theory of Hysteresis-Torque Devices.

Primary Examiner—William M. Shoop, Jr.
Assistant Examiner—D. Martin
Attorney, Agent, or Firm—William F. Noval

[57] ABSTRACT

A motion control system for a reel to reel web transport apparatus which maintains a controlled tension on a web as it is transported between reels. The motion control system includes brushless direct current motors directly coupled each reel. A magnetic hysteresis brake is coupled to each reel by means of respective one-way clutches. During transport of the web from reel to reel, a magnetic hysteresis brake applies a controlled torque only to the reel supplying web. Thus, a controlled tension is maintained on the web at all times, even during loss of power to the DC motors.

4 Claims, 6 Drawing Sheets

MOTION CONTROL SYSTEM FOR REEL TO REEL WEB TRANSPORT APPARATUS

BACKGROUND OF THE INVENTION

This invention relates in general to reel to reel web transport apparatus and more particularly to a motion control system for reel to reel web transport apparatus which maintains a controlled tension on the web at all times, even during loss of power to the web transport motors.

Reel to reel web transport apparatus are used to transport a web between reels past a utilization device. For example, magnetic tape recorders are widely used to record and reproduce, audio and video signals, instrumentation signals and digital data. In the transport of magnetic tape between reels, past record/reproduce (read/write) heads, the tape is subjected to velocity variations (such as acceleration, constant velocity and deceleration) which cause tape tension variations. In order to effect interchangeability of tapes between different tape recorders and to minimize degradation in recording and reproducing of information on the magnetic tape, it is desirable to maintain a controlled tension on the tape at all times. If the tape tension is too little during tape transport, the tape may slacken and become damaged by entanglement in the tape transport mechanism or by loose winding on the takeup reel. If the tape tension is too great during tape transport, the tape may become stretched during recording or reproducing, thus causing undesirable signal distortion and information degradation. It is thus desirable that a controlled tension be maintained on the tape at all times including loss of power to the tape drive motors.

Since the inertia of a reel of magnetic tape varies as the diameter of the tape pack decreases or increases during supply and takeup, tape tension also varies. A tape buffer or storage device has been used in order to minimize the effect of tape tension variations. Buffer devices, such as spring loaded storage arm devices and vacuum column buffer devices, are disadvantageous because of increased mechanical, electrical and control complexity and increased space requirements. Capstan drive tape transports are also disadvantageous due to mechanical and electrical complexity.

It has been proposed in U.S. Pat. No. 3,806,061, entitled "Tape Transport", issued Apr. 23, 1974, and U.S. Pat. No. 3,809,061, entitled "Tape Transport", issued May 7, 1974, to provide a simpler reel-to-reel tape transport by using a single reversible motor and constant force magnetic couplings to provide drag to the reels via one-way-clutches. The transports disclosed in these patents are disadvantageous because the single motor drive, although simple, lacks the flexibility of individual motor control for each reel to adapt to varying conditions of tape transport.

Thus, a reel-to-reel tape transport which uses separate motors for driving each reel offers several advantages over capstan drive transports and reel-to-reel transports, with or without buffer devices, for tape tension and speed control. The bufferless and capstanless reel-to-reel tape transport is simpler in mechanical structure, more space efficient, and requires fewer mechanical components. It also allows for a simpler and more efficient control system since only the reel motors are controlled. Thus, a motion control system for a reel-to-reel web transport apparatus should effect controlled tension of the web at all times over the full range of tape motion (e.g., at rest, acceleration, constant speed, and deceleration) in order to minimize signal degradation caused by undertensioning or overtensioning the web. Advantageously, in the event of loss of power to the reel drive motors or loss of intelligence to the control system, the motion control system should bring the web to a gentle and controlled stop.

SUMMARY OF THE INVENTION

According to the present invention, there is provided a motion control system for a bufferless and capstanless reel-to-reel web transport apparatus, which minimizes the disadvantages of web transport apparatus which use capstans and/or buffer devices to control tension and web motion. According to an aspect of the present invention, each reel of the web transport is driven by a brushless direct current motor and a magnetic hysteresis brake is coupled to each reel by means of one way clutch means. When web is transported from a reel, the magnetic hysteresis brake applies a controlled torque to the reel to effect a controlled tension on the web. Thus, the magnetic hysteresis brake is always connected to the reel from which web is transported and disconnected from the reel onto which the web is transported.

According to an important feature of the invention, a controlled tension on the web is provided at all times so that a slack loop of web is never allowed to occur. This controlled tension is even provided during loss of electrical power to the reel drive motors or during loss of intelligence to the motor control system. Thus, a positive drag torque will always exist on the reel supplying web. Even if power is suddenly lost while web is being transported at high speed, the drag torque on the supply reel will be sufficient to decelerate the entire web and two reel system in an orderly manner, until the system has come to a complete stop.

According to a feature of the invention, when the web is stopped, the magnetic hysteresis brakes associated with the supply and takeup reels automatically reposition the reels by means of the one-way clutches to maintain the web taught.

According to a further feature of the invention, since control of tape tension during web transport is partially provided by coupling a magnetic hysteresis brake to the reel supplying web, system efficiency is improved and motor losses in the reel motor are minimized.

According to another feature of the invention, servo control of the supply and takeup brushless direct current motors is provided by Hall effect devices which also provide commutation control signals. Thus, the cost and added complexity of separate tachometers is eliminated.

DESCRIPTION OF THE DRAWINGS

In a detailed description of the preferred embodiments of the invention presented below, reference is made to the accompanying drawings in which like numerals refer to like elements.

DESCRIPTION OF THE PREFERRED EMBODIMENT

Figure 1:
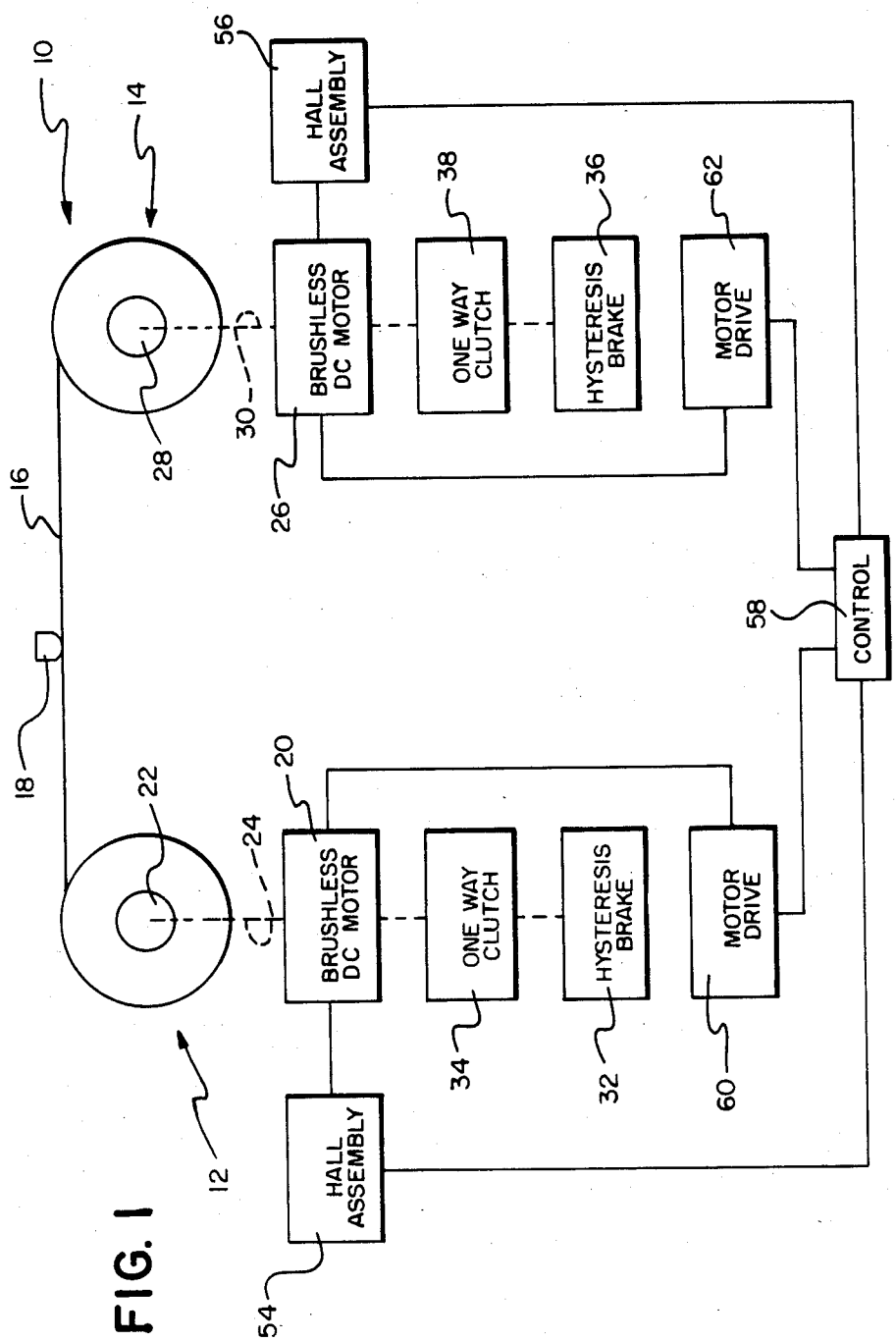
FIG. 1 is a block schematic diagram showing web transport apparatus including an embodiment of the present invention.

Although the motion control system of the present invention will be described with respect to a reel-to-reel magnetic tape transport apparatus, it will be understood that the present invention may be used advantageously in any reel-to-reel web transport apparatus. Referring to FIG. 1, there is shown a block schematic diagram of a magnetic tape transport apparatus including an embodiment of the present invention. An exemplary apparatus is a "serpentine" magnetic tape recorder, in which digital information is recorded on magnetic tape in successive parallel, longitudinal tracks as the tape is transported back and forth between reels past a magnetic head which is stepped laterally across the tape. As shown, apparatus 10 includes a file reel 12 and a fixed or machine reel 14 for magnetic tape 16 transported past a magnetic head 18. Reel 12 is contained in a cartridge (not shown) which is removable from apparatus 10 while reel 14 is permanently mounted in the apparatus. Tape 16 is transported from reel 12, past magnetic head 18 to reel 14. When reel 12 is almost empty of tape 16 and reel 14 is almost full, the direction of transport of tape 16 is reversed and tape 16 is transported from reel 12 to reel 14. The transport of tape 16, between reels 12 and 14, in alternate opposite directions, is continued as head 18 records successive longitudinal magnetic tracks of information on tape 16 across the width thereof.

Figure 7:
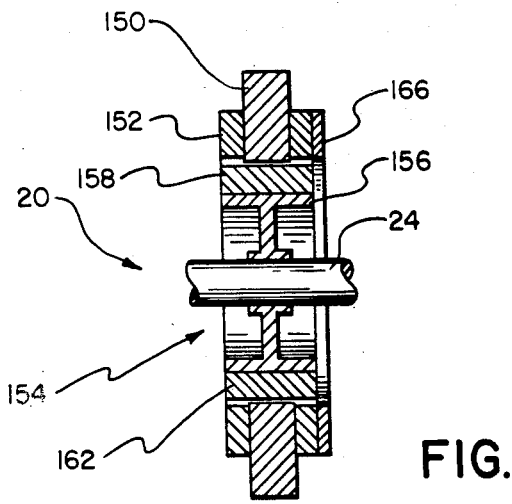
FIGS. 7 and 8 are respectively partially sectional side elevation and front elevational diagrammatic views of an exemplary brushless direct current motor for use in the apparatus of FIG. 1.
Figure 8:
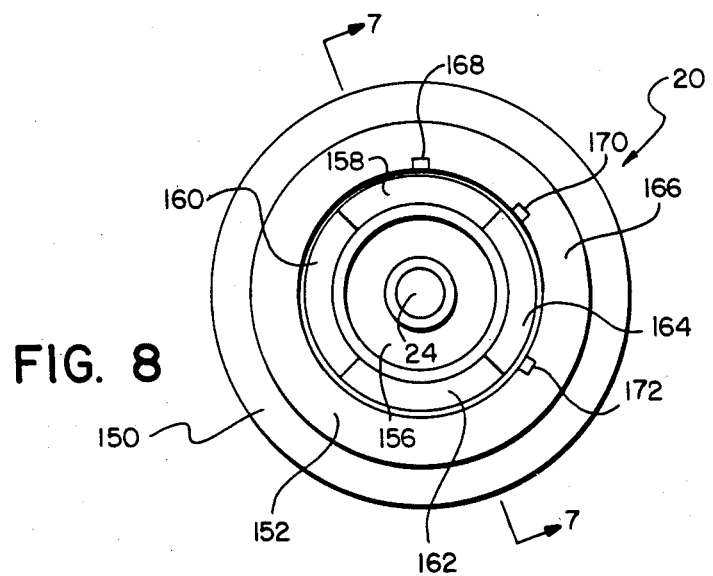

A brushless direct current (DC) motor 20 is coupled directly to the hub 22 of reel 12 by means of shaft 24. A brushless DC motor 26 is directly coupled to the hub 28 of reel 14 by means of shaft 30. Brushless DC motors 20 and 26 may, for example, be those provided by the Clifton Precision Division of Litton Industries and sold as a kit under Part No. D1-3522-3A-C. The construction and theory of operation of brushless DC motors is explained for example, in the engineering handbook published by the Electrocraft Corporation, Hopkins, MINN., entitled "DC Motors, Speed Controls, Servo System", fourth edition, 1978. An exemplary brushless DC motor is shown in FIGS. 7 and 8 and will be described later.

As shown in FIG. 1, a magnetic hysteresis brake 32 is coupled to reel 12 via shaft 24 of brushless DC motor 20 by means of supply one-way clutch 34. A magnetic hysteresis brake 36 is coupled via shaft 30 of brushless DC motor 26 by means of one-way clutch 38. One-way clutches 34 and 38 may, for example, be drawn cup roller clutches such as those supplied by the Torrington Company of Montebello, CA. In general, a one way clutch is sensitive to direction of applied torque, permitting it to sense automatically which reel is supplying web, as an example, if web is being transported from reel to reel at steady speed and then brought to a standstill, the role of the reels as supply and takeup reels may reverse under certain combinations of tape pack diameters, system friction, tape tension, etc.

Magnetic hysteresis brakes are known and are explained, for example, at pages 249–252 of the reference entitled "Permanent Magnets and Their Application",; by Roland J. Parker and Robert J. Scudders; published by John Wiley and Sons, New York, N.Y. In general, magnetic hysteresis brakes exhibit essentially constant torque independent of rotational speed. According to the present invention, the magnetic hysteresis brake is only coupled to a reel (through the motor shaft) when the reel is rotated in a web supply direction, to apply a controlled torque to the reel and consequently a controlled tension to tape 16. Such tension is independent of the rotational speed of the reel. With this arrangement, the reel which supplies tape (i.e., reel 12, when tape is transported in a direction from reel 12 to reel 14 or reel 14, when tape is transported in a direction from reel 14 to reel 12) is automatically connected to its respective hysteresis brake by means of a one way clutch.

Figure 2:
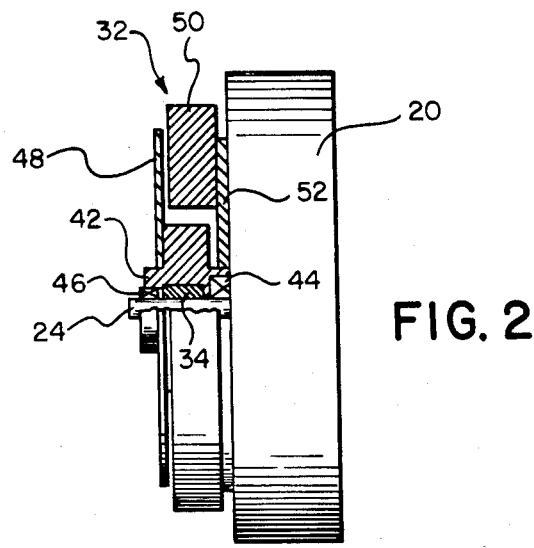
FIG. 2 is a partially sectional elevational view illustrating one arrangement of motor, clutch and brake of the apparatus of FIG. 1.

Referring to FIG. 2, there is shown an exemplary arrangement of brushless DC motor, one-way clutch and magnetic hysteresis brake. As shown, a brushless DC motor such as motor 20 has a shaft 24 upon which is mounted magnetic hysteresis brake 32. Hysteresis brake 32 includes a hub 42 rotatably mounted on shaft 24 by means of bearings 44 and 46; a rotatable magnetic hysteresis disk 48 mounted on hub 42; and a stationary permanent magnet 50 mounted on magnetic plate 52 secured to motor 20. A drawn cup roller one-way clutch 34 is mounted between shaft 24 and hub 42. In one direction of rotation of motor 20, clutch 34 allows shaft 24 to freely rotate within hub 42. In the reverse direction of rotation of motor 20, one-way clutch 34 locks hub 42 to shaft 24 so that disc 48 rotates with shaft 24. A drag torque is thus produced through the interaction between the magnetic disc 48 and stationary magnet 50. Motor 26, one way clutch 38 and magnetic hysteresis brake 36 are structurally arranged in a similar manner.

Referring now to FIGS. 7 and 8, there is shown in greater detail an exemplary brushless direct current motor 20. Motor 26 is preferably of identical construction. Motor 20 is a three phase, wye connected motor including stator 150 having windings 152 and a rotor assembly 154 mounted on shaft 24. Rotor assembly 154 includes hub 156 and permanent magnets 158, 160, 162 and 164 circumferentially mounted on hub 156. A circuit board assembly 166 is mounted on stator 150. Assembly 166 includes Hall effect devices 168, 170, 172 (Box 54 of FIG. 1) and electrical conductors (not shown) (1) for supplying power to the three phase, wye connected coils; (2) for supplying bias to Hall effect devices 168, 170, 172; and (3) for receiving the output signals HS1, HS2 and HS3 (FIG. 5) from devices 168, 170, 172.

In general, Hall effect devices produce an output signal which is a function of a magnetic field to which the device is exposed. Device 168 is mounted at a position represented as "0" mechanical degrees; device 170 is mounted at "60" mechanical degrees and device 172 is mounted at "120" mechanical degrees. As magnets 158, 160, 162 and 164 rotate past devices 168, 170, 172; device 168 produces signal HS1 (FIG. 5), device 170 produces signal HS2, and device 172 produces signal HS3.

The output signals (e.g., HS1, HS2, HS3) produced by Hall device assemblies 54 and 56 are applied to control circuit 58. Circuit 58 produces control voltages and commutation signals to control the operation of motors 20 and 26 by means of motor drive circuit 60 and motor drive circuit 62, respectively.

Figure 3:
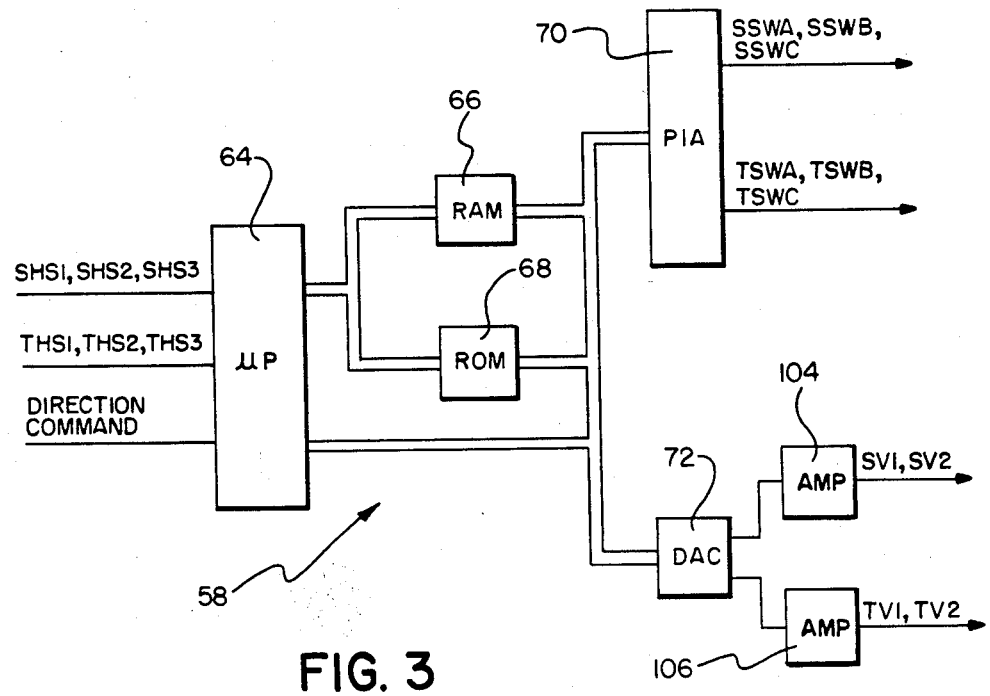
FIG. 3 is a block schematic diagram showing details of the control circuit of the apparatus of FIG. 1.

As shown in FIG. 3, control circuit 58 includes a microprocessor 64, random access memory (RAM) 66, read only memory (ROM) 68, peripheral interface adapter (PIA) 70, and digital to analog converter (DAC) 72. Microprocessor 64 may, for example, be an 8-bit, 16-bit or other standard microprocessor known to those skilled in the art. The RAM 66, ROM 68, PIA 70 and DAC 72 are typically matched to a microprocessor manufactured by a specific company. In general, the programming and operation of microprocessors and related peripheral devices are well known to those skilled in the art and are explained for example, in the Harvard textbook entitled "The Art of Electronics", by Horowitz and Hill, Cambridge University Press, Cambridge, MASS., in the chapter entitled "Microprocessors", Chapter 11 at page 484 et seq. The circuit of FIG. 3 will be described in greater detail later.

Figure 4:
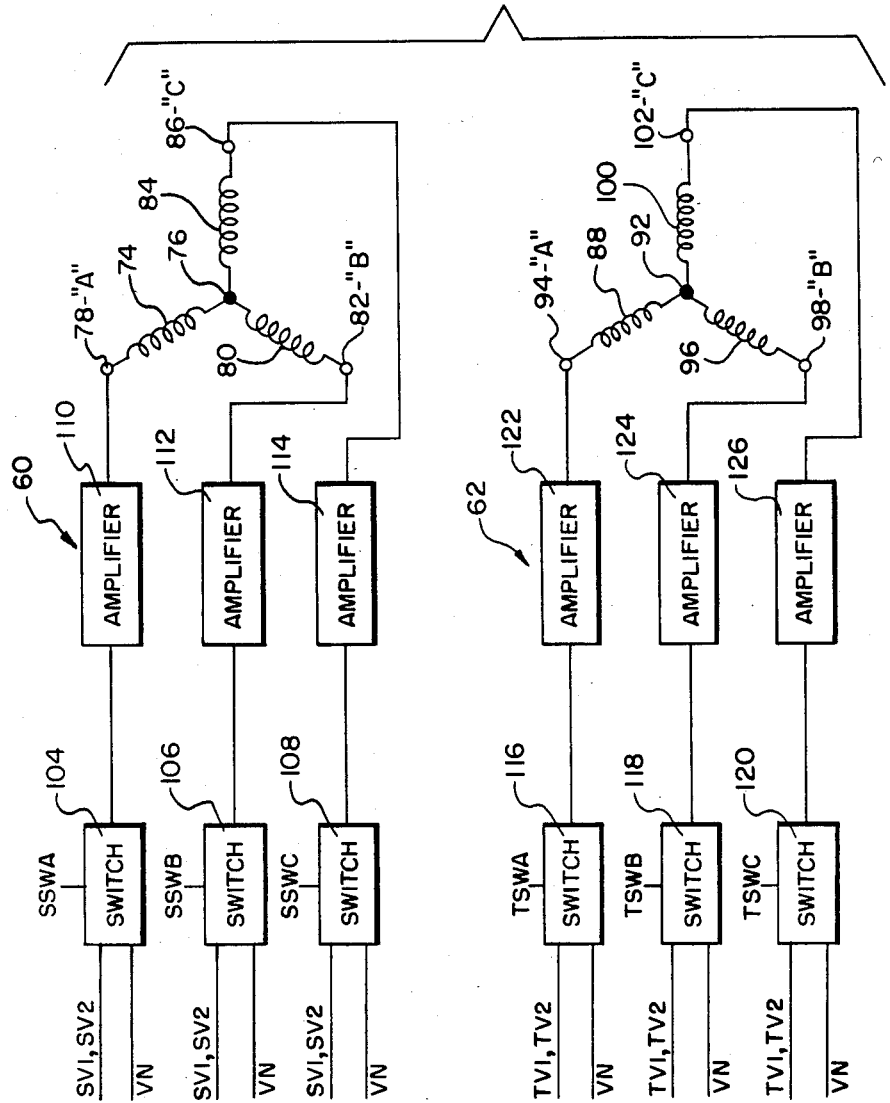
FIG. 4 is a block schematic diagram showing details of the motor drive circuits of the apparatus of FIG. 1.

Referring now to FIG. 4, there is shown in greater detail, motor drive circuits 60 and 62 and the three phase windings of motors 20 and 26. Thus, the motor 20 includes phase A winding 74 connected between terminal 76 and "A" terminal 78; phase B winding 80 connected between terminal 76 and "B" terminal 82; and phase C winding 84 connected between terminal 76 and "C" terminal 86. Similarly, motor 26 includes phase A winding 88 connected between terminal 92 and "A" terminal 94; phase B winding 96 connected between terminal 92 and "B" terminal 98; and phase C winding 100 connected between terminal 92 and "C" terminal 102. Motor drive 60 includes switch 104 and amplifier 110 for phase A; switch 106 and amplifier 112 for phase B; and switch 108 and amplifier 114 for phase C of motor 20. Motor drive circuit 62 includes switch 116 and amplifier 122 for phase A; switch 118 and amplifier 124 for phase B; and switch 120 and amplifier 126 for phase C of takeup motor 26.

Figure 5:
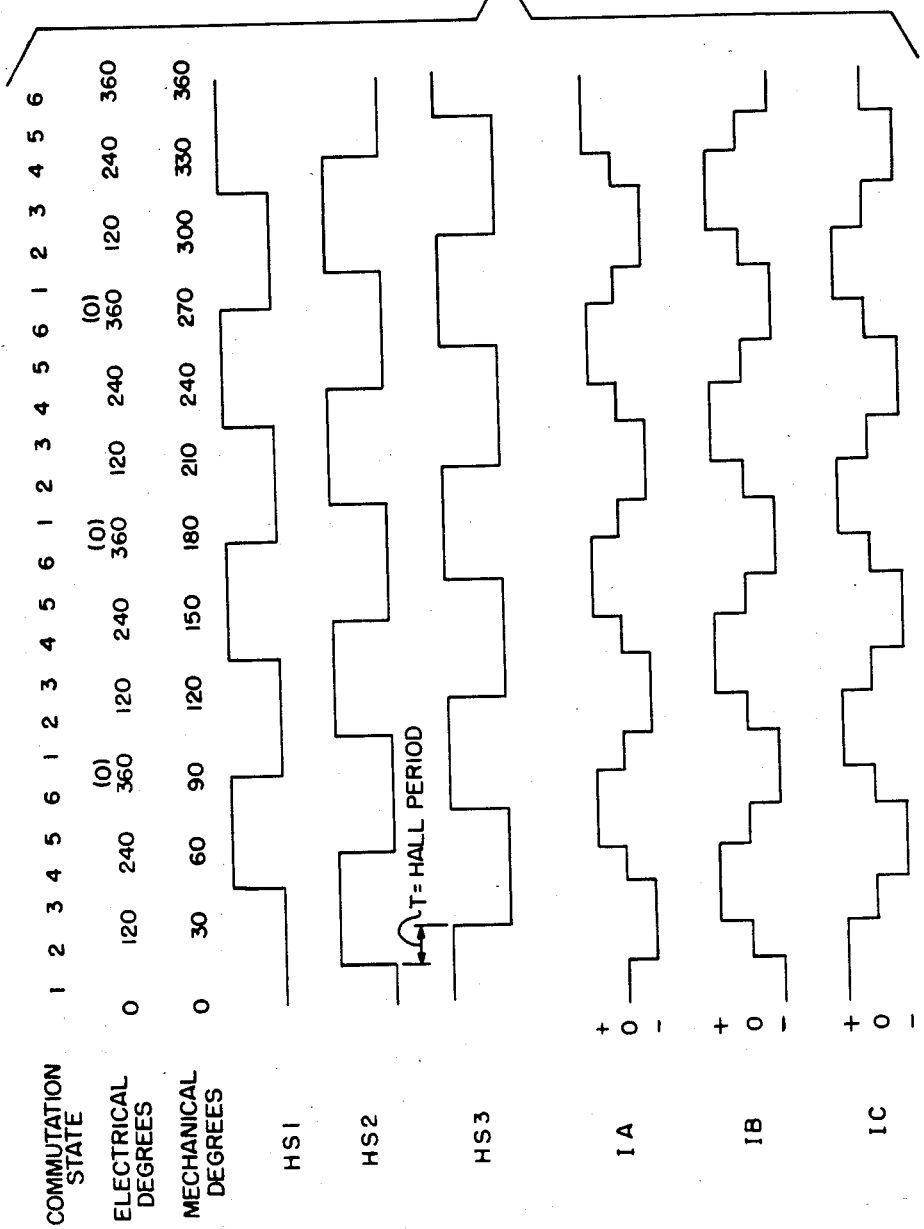
FIG. 5 is a group of waveform diagrams which illustrate the operation of the apparatus of FIG. 1.

Referring to FIG. 5, there are shown exemplary current waveforms IA, IB and IC. In the wye connection of coils A, B, C, during motor operation, electrical current flows through two of the three coils while no current flows in the third coil. Since each of the exemplary motors 20 and 26 has four permanent magnets mounted on the rotor, during each revolution of a rotor, four complete electrical cycles of current flow through the stator coils. Thus, there is a 360° electrical current cycle for every 90° mechanical rotation of the rotor.

Figure 6:
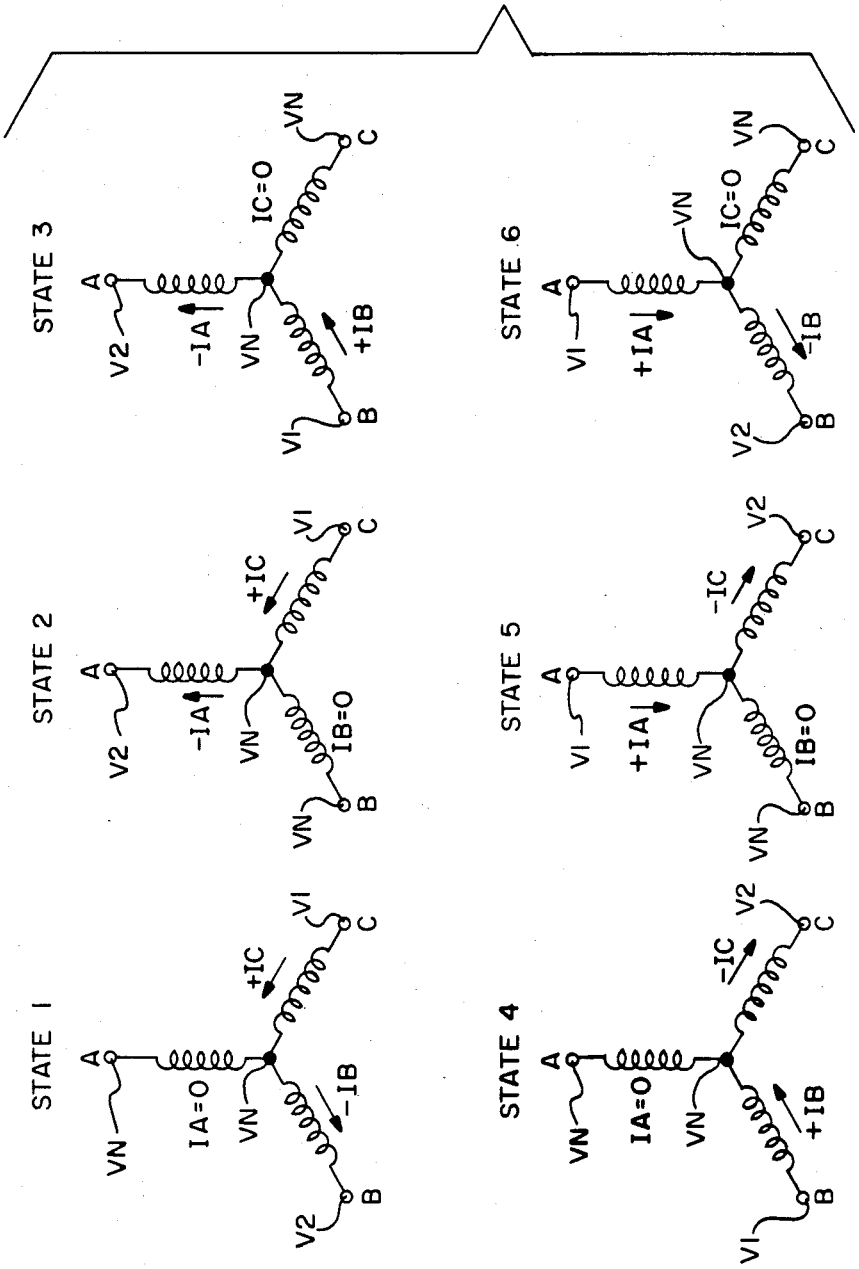
FIG. 6 is a group of schematic diagrams illustrating operation of the motor drive circuits of FIG. 4.

Exemplary operation of motor 20 during a complete electrical cycle is explained with reference to FIGS. 5 and 6. During state 1, current flows from terminal C to terminal B. Thus, current IC is positive (i.e., current from terminal C to terminal N), current IB is negative (i.e., current flows from terminal N to terminal B) and current IA equals zero (no current flows in coil A). During state 2, the current sink is switched from coil B to coil A. Thus, current flows from terminal C to terminal A (IC is positive, IA is negative and IB is zero). During state 3, the current flows from terminal B to terminal A (IB is positive, IA is negative and IC equals zero). During state 4, the current sink switches from coil A to coil C and current flows from terminal B to terminal C. (IB is positive, IC is negative and IA equals zero). During state 5, the current flows from terminal A to terminal C through coils A and C (IA is positive, IC is negative and IB equals zero). During state 6, the current flows from terminal A to terminal B through coils A and B (IA is positive, IB is negative, and IC equals zero). This sequence is repeated for three more cycles to effect a single revolution of the rotor.

The value of the current flowing through the coils of motors 20 and 26 is determined by the voltages applied to terminals A, B and C. This current is a function of the servo control algorithm applied to motors 20 and 26 to effect acceleration, constant speed and deceleration of tape 16 as it is transported between reels 12 and 14. Such servo control algorithm is not a part of the present invention. In the examples shown in FIG. 6, it is assumed that terminal N is maintained at a constant voltage VN from state to state. For example, during state 1, a voltage VN is applied to terminal A and the voltage across coil A between terminal N and terminal A equals zero so that IA equals zero. The voltage between terminal C and terminal N equals the voltage between terminal N and terminal B so that IC equals IB. Thus, if a voltage V1 is applied to terminal C, the voltage V2 applied to terminal B must satisfy the equation V1−VN=VN−V2. (For example, if VN is maintained constant at 6 volts and V1 equals 11 volts, to provide a voltage of 5 volts across coil C, the voltage V2 applied to terminal B should equal 1 volt, so that the voltage across coil B is also 5 volts).

According to a feature of the present invention, control of motors 20 and 26 is effected without use of a separate tachometer for tape tension and velocity control. Instead, the Hall signals provide rotational speed information as well as rotational position information. The use of Hall effect devices to provide both velocity and position signals to effect servo control requires a consideration of the required resolution of the velocity and position signals in order to satisfy overall system performance specifications. Referring to the control circuit 58 in FIG. 3, and referring also to the motor drive circuits shown in FIG. 4, motor control of motors 20 and 26 will now be explained. Microprocessor 64 (FIG. 3) is provided with Hall signals SHS1, SHS2, and SHS3 produced by the Hall device assembly 54 of motor 20 and Hall signals THS1, THS2, and THS3 produced by the Hall device assembly 56 of motor 26. Microprocessor 64 is also provided with a direction command signal (for example, from a manually actuated switch). Control circuit 58 produces commutation control signals SSWA, SSWB and SSWC, commutation control signals TSWA, TSWB, and TSWC; and servo voltage signals SV1 SV2 and TV1 and TV2.

If motor 26 rotates reel 14 in a direction to transport tape 16 onto takeup reel 14, reel 12 is rotated in a direction to transport tape from reel 12. Magnetic hysteresis brake 32 is then coupled to motor 20 by clutch 34 to produce a drag torque on reel 12 and consequently a controlled tension on tape 16. The operation of motor 20 will be ignored for this explanation, During state 1, the control signal TSWA actuates switch 116 to apply voltage VN through amplifier 122 to the "A" terminal 94 of motor 26. Control signal TSWB actuates switch 118 to apply voltage TV2 to "B" terminal 98 of motor 26. Control signal TSWB actuates switch 120 to apply voltage TV1 to "C" terminal 102 of motor 26.

During state 2, control signal TSWA actuates switch 116 to apply voltage TV2 to "A" terminal 94; control signal TSWB actuates switch 118 to apply voltage VN to "B" terminal 98; and signal TSWC actuates switch 120 to apply voltage TV1 to "C" terminal 102.

During state 3, control signal TSWA actuates switch 116 to apply voltage TV2 to "A" terminal 94; control signal TSWB actuates switch 118 to apply voltage TV1 to "B" terminal 98; and control signal TSWC actuates switch 120 to apply voltage VN to "C" terminal 102.

During state 4, control signal TSWA actuates switch 116 to apply voltage VN to "A" terminal 94; control signal TSWB acutates switch 118 to apply voltage TV1 to "B" terminal 98; and control signal TSWC actuates switch 120 to apply voltage TV2 to "C" terminal 102.

During state 5, control signal TSWA actuates switch 116 to apply voltage TV1 to "A" terminal 94; control signal TSWB actuates switch 118 to apply voltage VN to "B" terminal 98; and control signal TSWC actuates switch 120 to apply voltage TV2 to "C" terminal 102.

Finally, during state 6, control signal TSWA actuates switch 116 to apply voltage TV1 to "A" terminal 94; control signal TSWB actuates switch 118 to apply voltage TV2 to "B" terminal 98; and control signal TSWC actuates switch 120 to apply voltage VN to "C" terminal 102. This commutation cycle is repeated for succeeding electrical cycles.

Appropriate commutation control signals SSWA, SSWB and SSWC and servo voltages SV1, SV2 are also applied by circuit 58 to circuit 60 to rotate motor 20 in a supply direction but, because hysteresis brake 32 is coupled to reel 12 by clutch 34, the power used by motor 20 to effect tension on tape 16, is reduced, reducing motor losses. Under proper conditions, no power need be applied to motor 20 so that brake 32 supplies all the drag torque necessary to effect tape tension control.

It will be appreciated, that, the total drag torque on a reel from which tape is transported, is the sum of the drag produced by the magnetic hysteresis brake and the torque produced by the brushless motor. In general, depending upon the instantaneous relative diameters of the tape packs on the supply and takeup reels, the motor torque may be either aiding or opposing the brake torque. The magnitude of the braking torque is selected such that it will always be sufficient, in case of power loss, to decelerate the entire web transport system to a stop without stressing the web between the supply and takeup reels.

The invention has been described in detail with particular reference to preferred embodiments thereof, but it will be understood that variations and modifications can be effected within the spirit and scope of the invention.

What is claimed is:

1. In web transport apparatus for transporting a web between first and second reels, a motion control system comprising:
   first and second brushless direct current (DC) motors respectively coupled to said first and second reels;
   a first rotatably mounted magnetic hysteresis brake;
   a second rotatably mounted magnetic hysteresis brake;
   first clutch means for coupling said first magnetic hysteresis brake to said first reel when said first reel is rotated in a first direction, said coupled brake applying a controlled torque to said first reel thereby effecting a controlled tension on said web as it is transported from said first reel to said second reel, and for uncoupling said first magnetic hysteresis brake from said first reel when said first motor rotates said first reel in a direction opposite to said first direction so that said first brake applies no torque to said first reel as web is transported onto said first reel;
   second clutch means for coupling said second magnetic hysteresis brake to said second reel when said second reel is rotated in a first direction, said coupled brake applying a controlled torque to said second reel, thereby effecting a controlled tension on said web as it is transported from said second reel to said first reel, and for uncoupling said second magnetic hysteresis brake from said second reel when said second motor rotates said second reel in a direction opposite said first direction, so that said second brake applies no torque to said second reel as web is transported onto said second reel; and
   including a first Hall device assembly mounted on said first brushless direct current motor and a second Hall device assembly mounted on said second brushless direct current motor, wherein said first and second Hall device assemblies produce respective motor control signals which are used to control both the commutation and servo voltage control of said respective first and second brushless direct current motors.

2. In magnetic tape transport apparatus for transporting magnetic tape between first and second reels past a magnetic head assembly, a magnetic tape motion control system comprising:
   a first brushless direct current motor connected to said first reel;
   a second brushless direct current motor connected to said second reel;
   a first magnetic hysteresis brake;
   a second magnetic hysteresis brake;
   a first one way clutch coupled between said first magnetic hysteresis brake and said first reel;
   a second one way clutch coupled between said second magnetic hysteresis brake and said second reel;
   control means for actuating said second motor to rotate said second reel in a direction to transport magnetic tape onto said second reel from said first reel such that said first one way clutch couples said first hysteresis brake to said first reel to apply a controlled torque to said first reel to effect a controlled tension on said magnetic tape as it is transported from said first reel onto said second reel and for actuating said first motor to rotate said first reel in a direction to transport magnetic tape onto said first reel from said second reel, such that said second one way clutch couples said second hysteresis brake to said second reel to apply a controlled torque to said second reel to effect a controlled tension on said second reel to effect a controlled tension on said tape as it is transported from said second reel onto said first reel; and
   wherein said first motor includes a first Hall device assembly for producing first Hall signals and wherein said second motor includes a second Hall device assembly for producing second Hall signals and wherein said control means receives said first and second Hall signals from said Hall device assemblies and as a function of said Hall signals, produces both commutation control signals and servo voltage signals to control said first and second motors.

3. The system of claim 2 wherein said first motor is directly connected to said first reel by a first shaft assembly and wherein said first one way clutch directly couples said first hysteresis brake to said first reel by means of said first shaft assembly and wherein said second motor is directly connected to said second reel by a second shaft assembly and wherein said second one way clutch directly couples said second hysteresis brake to said second reel by means of said second shaft assembly.

4. In web transport apparatus for transporting a web between first and second reels, a motion control system comprising:

- a first brushless direct current (DC) motor including a stator having a plurality of motor windings and a permanent magnet rotor coupled to said first reel;
- first Hall device means, mounted on said stator of said first motor for producing, in response to rotation of said permanent magnet rotor of said first motor, first Hall signals which are representative of the rotational position and rotational speed of said rotor;
- a second brushless DC motor including a stator having a plurality of motor windings and a permanent magnet rotor coupled to said second reel;
- second Hall device means mounted on said stator of said second motor for producing, in response to rotation of said permanent magnet rotor of said second motor, second Hall signals which are representative of the rotational position and rotational speed of said rotor;
- control means for producing, in response to said first and second Hall signals, servo voltage signals and commutation signals which are selectively applied to said motor windings of said first and second motors to control the rotation of said respective rotors of said motors and thereby the transport of said web between said first and second reels;
- a first magnetic hysteresis brake;
- first one-way clutch means for coupling said first magnetic hysteresis brake to said first reel only when said first reel is rotated in a direction to transport web from said first reel to said second reel;
- a second magnetic hysteresis brake; and
- second one-way clutch means for coupling said second magnetic hysteresis brake to said second reel only when said second reel is rotated in a direction to transport web from said second reel to said first reel.

* * * * *